(12) United States Patent
Yoshida

(10) Patent No.: US 8,223,175 B2
(45) Date of Patent: Jul. 17, 2012

(54) VIDEO SIGNAL CONTROL APPARATUS AND VIDEO SIGNAL CONTROL METHOD

(75) Inventor: Ritsuo Yoshida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 12/350,879

(22) Filed: Jan. 8, 2009

(65) Prior Publication Data
US 2009/0322796 A1    Dec. 31, 2009

(30) Foreign Application Priority Data

Jun. 27, 2008   (JP) .................. 2008-168261

(51) Int. Cl.
G09G 5/10 (2006.01)
G09G 3/32 (2006.01)
G09G 3/36 (2006.01)
H04N 5/57 (2006.01)

(52) U.S. Cl. ............. 345/690; 345/82; 345/87; 348/687

(58) Field of Classification Search .................. 345/690, 345/82–83, 87–89; 348/687–688, 630–631
See application file for complete search history.

(56) References Cited

U.S. PATENT DOCUMENTS

| | | | |
|---|---|---|---|
| 7,081,906 B2 | 7/2006 | Kim et al. | |
| 2003/0210256 A1* | 11/2003 | Mori et al. | 345/690 |
| 2004/0164933 A1 | 8/2004 | Weitbruch et al. | |
| 2005/0001935 A1 | 1/2005 | Kiuchi et al. | |
| 2006/0125723 A1 | 6/2006 | Choi et al. | |
| 2006/0221260 A1 | 10/2006 | Fujine et al. | |
| 2007/0097027 A1 | 5/2007 | Moon | |
| 2008/0036872 A1 | 2/2008 | Nobori | |
| 2008/0123987 A1* | 5/2008 | Shen et al. | 382/255 |

FOREIGN PATENT DOCUMENTS

| | | |
|---|---|---|
| JP | 2000-250463 | 9/2000 |
| JP | 2002-372943 | 12/2002 |
| JP | 2003-244480 | 8/2003 |
| JP | 2004-354913 | 12/2004 |
| JP | 2005-122217 | 5/2005 |
| JP | 2005-123957 | 5/2005 |
| JP | 2007-049693 | 2/2007 |
| JP | 2007-147867 | 6/2007 |
| JP | 2007-163557 | 6/2007 |
| JP | 2008-015225 | 1/2008 |
| JP | 2008-304539 | 12/2008 |

OTHER PUBLICATIONS

Office Action with Partial English Translation of Office Action in a corresponding Japanese application; application No. 2008-168261 dated May 8, 2009.

* cited by examiner

*Primary Examiner* — Sumati Lefkowitz
*Assistant Examiner* — Jonathan Horner
(74) *Attorney, Agent, or Firm* — Blakely, Sokoloff, Taylor & Zafman LLP

(57) ABSTRACT

According to one embodiments a video signal control apparatus includes an average luminance detector and a display luminance controller. The average luminance detector detects the average luminance of a video signal with respect to each frame. The display luminance controller controls the display luminance of a first frame using the average luminance of a second frame prior to the first frame. When luminance change from the average luminance of the first frame to that of the second frame exceeds a predetermined threshold, the display luminance controller replaces the average luminance of the second frame with that of the first frame to control the display luminance of the first frame based on the average luminance of the first frame.

4 Claims, 4 Drawing Sheets

VIDEO SIGNAL CONTROL APPARATUS AND VIDEO SIGNAL CONTROL METHOD

CROSS-REFERENCE TO RELATED APPLICATIONS

This application is based upon and claims the benefit of priority from Japanese Patent Application No. 2008-168261, filed Jun. 27, 2008, the entire contents of which are incorporated herein by reference.

BACKGROUND

1. Field

One embodiment of the invention relates to a video signal control apparatus and a video signal control method for displaying video with controlled display luminance.

2. Description of the Related Art

Self-luminous display panels, such as organic electroluminescence (EL) panels, have a high correlation between the display luminance and the power consumption. In such a display panel, when the average luminance of a video signal is low, the display luminance is controlled to be higher (brighter). When the average luminance of a video signal is high, the display luminance is controlled to be lower (darker). Thus, a balance is achieved between image quality (brightness and contrast) and restriction on the maximum power consumption.

Japanese Patent Publication No. 3592126 discloses a video signal control method, in which the average luminance of a video signal is detected with respect to each frame, and the display luminance is controlled according to the average luminance. More specifically, a correlation between frames of a video signal is detected as a frame correlation. A gain is set according to the frame correlation so that the display luminance changes slower when the frame correlation is high, while it changes faster when the frame correlation is low.

The display luminance control based on the average luminance of a video signal may cause the display luminance of the entire screen to change even when only part of the screen changes, as, for example, when only the foreground moves without change in the background, resulting in unstable video display. Meanwhile, when, for example, the entire screen changes as in a scene change, such control may reduce response to a change in the display luminance.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a video signal control apparatus comprises: an average luminance detector configured to detect average luminance of a video signal with respect to each frame; and a display luminance controller configured to control display luminance of a first frame using average luminance of a second frame prior to the first frame. When luminance change from average luminance of the first frame to the average luminance of the second frame exceeds a predetermined threshold, the display luminance controller replaces the average luminance of the second frame with the average luminance of the first frame to control the display luminance of the first frame based on the average luminance of the first frame.

According to another embodiment of the invention, a video signal control method comprises: detecting average luminance of a video signal with respect to each frame; controlling display luminance of a first frame using average luminance of a second frame prior to the first frame; and replacing, when luminance change from average luminance of the first frame to the average luminance of the second frame exceeds a predetermined threshold, the average luminance of the second frame with the average luminance of the first frame to control the display luminance of the first frame based on the average luminance of the first frame.

Figure 1:
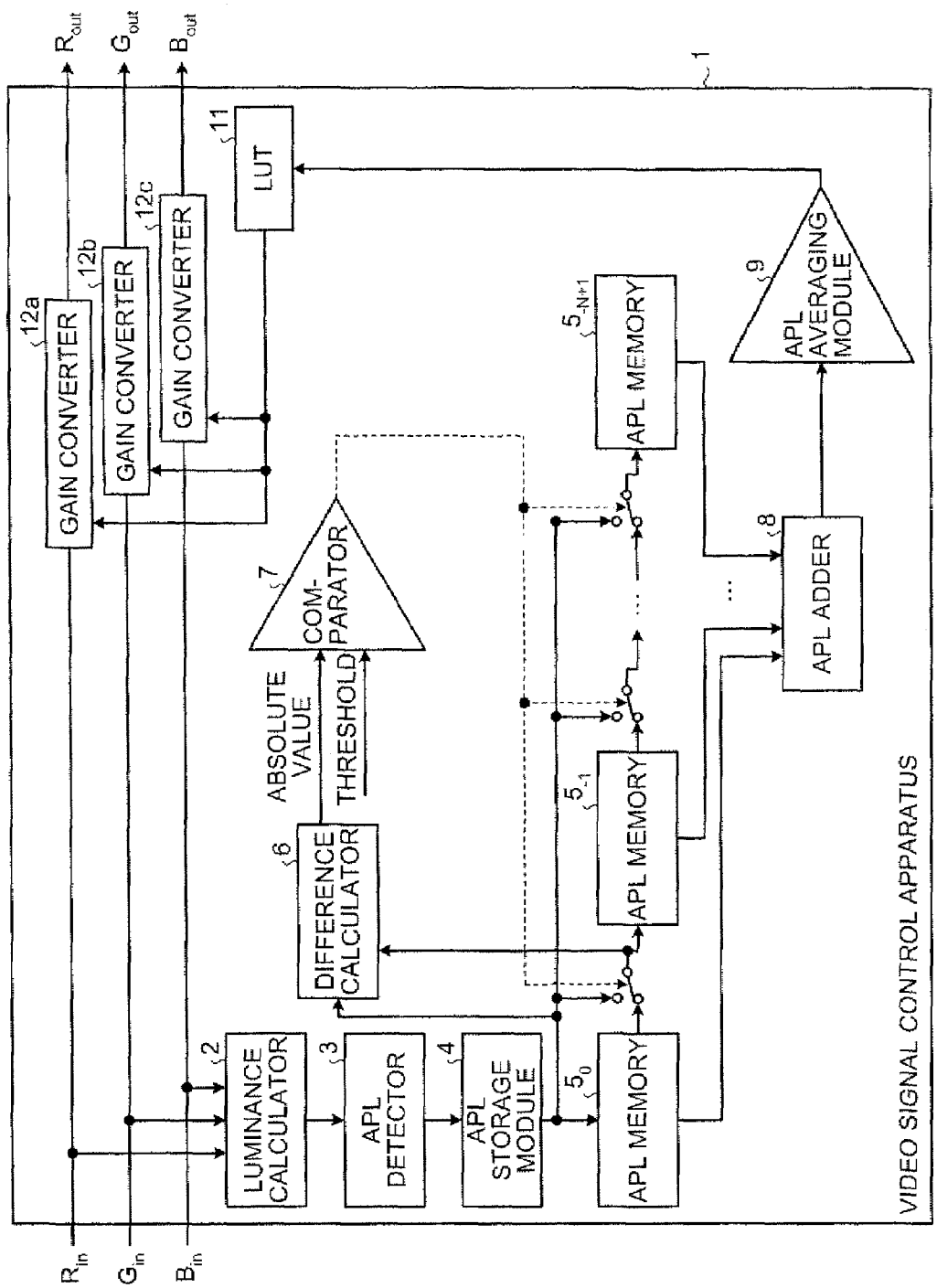
FIG. 1 is an exemplary circuit diagram of a video signal control apparatus according to a first embodiment of the invention.

FIG. 1 is a circuit diagram of a video signal control apparatus 1 according to a first embodiment of the invention. As illustrated in FIG. 1, the video signal control apparatus 1 comprises a luminance calculator 2, an average picture level (APL), i.e., average luminance level, detector 3, an APL storage module 4, APL memories $5_0$, $5_{-1}$, . . . , $5_{-N+1}$, a difference calculator 6, and a comparator 7. The video signal control apparatus 1 further comprises an APL adder 8, an APL averaging module 9, a lookup table (LUT) 11, and gain converters 12a, 12b and 12c. The luminance calculator 2 and the APL detector 3 constitute an average luminance detector, and detects the average luminance of a video signal with respect to each frame. The APL storage module 4, the APL memories $5_0$ to $5_{-N+1}$, the difference calculator 6, the comparator 7, the APL adder 8, the APL averaging module 9, the LUT 11, and the gain converters 12a, 12b and 12c constitute a display luminance controller, and controls the display luminance of a predetermined frame based on the average luminance of a frame prior to the predetermined frame.

The luminance calculator 2 calculates a luminance value from a video signal consisting of three color signals (R signal, G signal, and B signal). The APL detector 3 multiplies the luminance value obtained by the luminance calculator 2 by one frame, thereby detecting APL for each frame.

The APL storage module 4 temporarily stores the APL of the current frame detected by the APL detector 3. The APL memories $5_0$ to $5_{-N+1}$ store the APLs of previous N frames detected by the APL detector 3 frame by frame, respectively. More specifically, the APL memory $5_0$ stores the APL of a frame prior by one frame to the current frame. Similarly, the APL memory $5_{-1}$ stores the APL of a frame prior by two frames to the current frame, and the APL memory $5_{-N+1}$ stores the APL of a frame N frames prior to the current frame.

The difference calculator 6 calculates the absolute value of the difference between the APL stored in the APL memory 50 and that stored in the APL storage module 4. The absolute value of the difference represents the amount of APL change from the APL of a frame prior by one frame to the current frame to that of the current frame. The absolute value of the difference, i.e., APL change, is small when only the foreground moves without change in the background. On the other hand, the absolute value is large when the entire screen changes as in a scene change The comparator 7 compares the absolute value of the difference obtained by the difference calculator 6 with a predetermined threshold. When the absolute value is equal to or below the threshold (i.e., in such a case as that only part of the screen moves or changes), the comparator 7 shifts the APLs stored in the APL memories $5_0$ to $5_{-N+2}$, respectively, by one frame, and stores them back in the APL memories $5_{-1}$ to $5_{-N+1}$, respectively. The comparator 7 then stores the APL stored in the APL storage module 4 in the APL memory $5_0$. On the other hand, when the absolute value exceeds the threshold (i.e., in such a case as that the entire screen changes), the comparator 7 stores the APL stored in the APL storage module 4 in the APL memories $5_0$ to $5_{-N+1}$. In other wards, when the absolute value of the difference exceeds the threshold, the APLs of previous N frames are replaced by the APL of the current frame.

The APL adder B adds up the APLs stored in the APL memories $5_0$ to $5_{-N+1}$. The APL averaging module 9 divides the sum of the APLs obtained by the APL adder 8 by N to obtain the average of the APLs.

Figure 2:
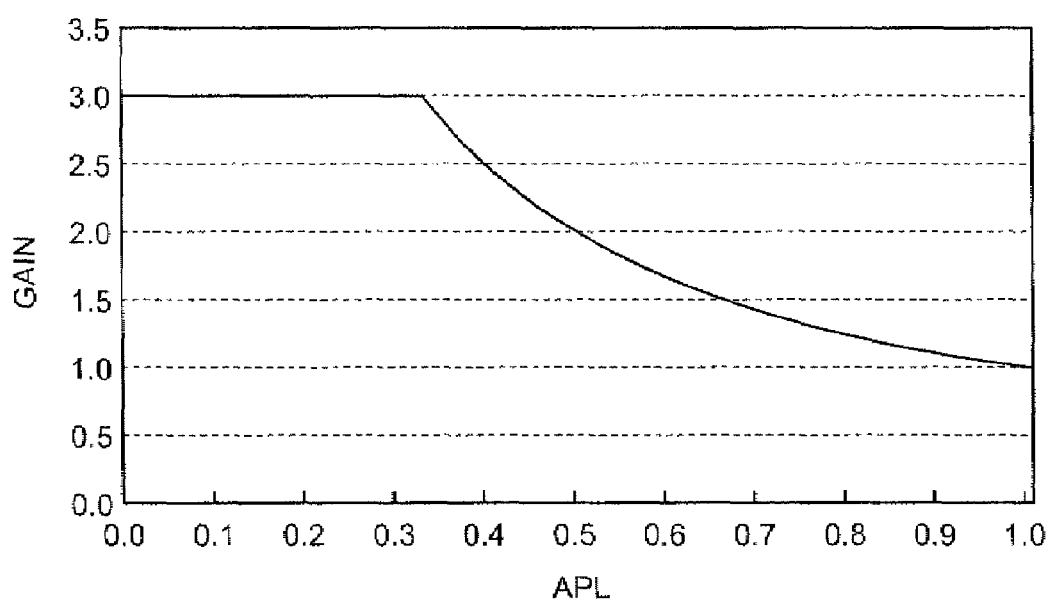
FIG. 2 is an exemplary graph of relation between APL and gain (value for controlling the display luminance for each frame) in the embodiment.

The LUT stores the APLs each in association with a gain (a value for controlling the display luminance for each frame). As illustrated in FIG. 2, the gain gradually decreases as the APL increases above 0.3. This means that when the APL is low, the display luminance is controlled to be higher (brighter), and that when the APL is high, the display luminance is controlled to be lower (darker). With this, a balance can be achieved between image quality (brightness and contrast) and restriction on the maximum power consumption. In FIG. 2, the entire screen is black at an APL of 0.0, while the entire screen is white at an APL of 1.0.

The gain converters 12a, 12b and 12c retrieve, from the LUT 11, a gain corresponding to the average of the APLs obtained by the APL averaging module 9. The gain converters 12a, 12b and 12c then multiply each of three color signals (R signal, G signal, and B signal) by the gain to control the display luminance for each frame.

In the video signal control apparatus 1 configured as above, when the change is small from the APL of a frame prior by one frame to the current frame to that of the current frame, and the absolute value of the difference between the APLs is equal to or below the threshold (i.e., in such a case as that only part of the screen moves or changes), the gain is set based on the average of the APLs of current and previous N frames to control the display luminance of the current frame. On the other hand, when there is a substantial change from the APL of a frame prior by one frame to the current frame to that of the current frame, and the absolute value of the difference between the APLs exceeds the threshold (i.e., in such a case as that the entire screen changes), the gain is set based on the APL of the current frame to control the display luminance of the current frame.

As described above, according to the first embodiment, when the APL change is small, the display luminance of the current frame is controlled based on the average of the APLs of current and previous frames. This suppresses the effect on the display luminance of the entire screen when only part of the screen moves, for example, when only the foreground moves without change in the background. Thus, video can be stabilized. When the APL change is large, the display luminance of the current frame is controlled based on the APL of the current frame. This ensures response to a change in the display luminance when, for example, the entire screen changes as in a scene change. Thus, the video signal control apparatus 1 can achieve a balance between stability and response in the control of the display luminance.

Moreover, when the absolute value of the difference between APLs exceeds the threshold, the video signal control apparatus 1 replaces the APLs of previous frames with the APL of the current frame. Therefore, unless the absolute value of the difference between APLs exceeds the threshold in frames subsequent to the current frame, stable control can be achieved together with the averaging of APLs without effect from the APLs of previous frames.

Figure 3:
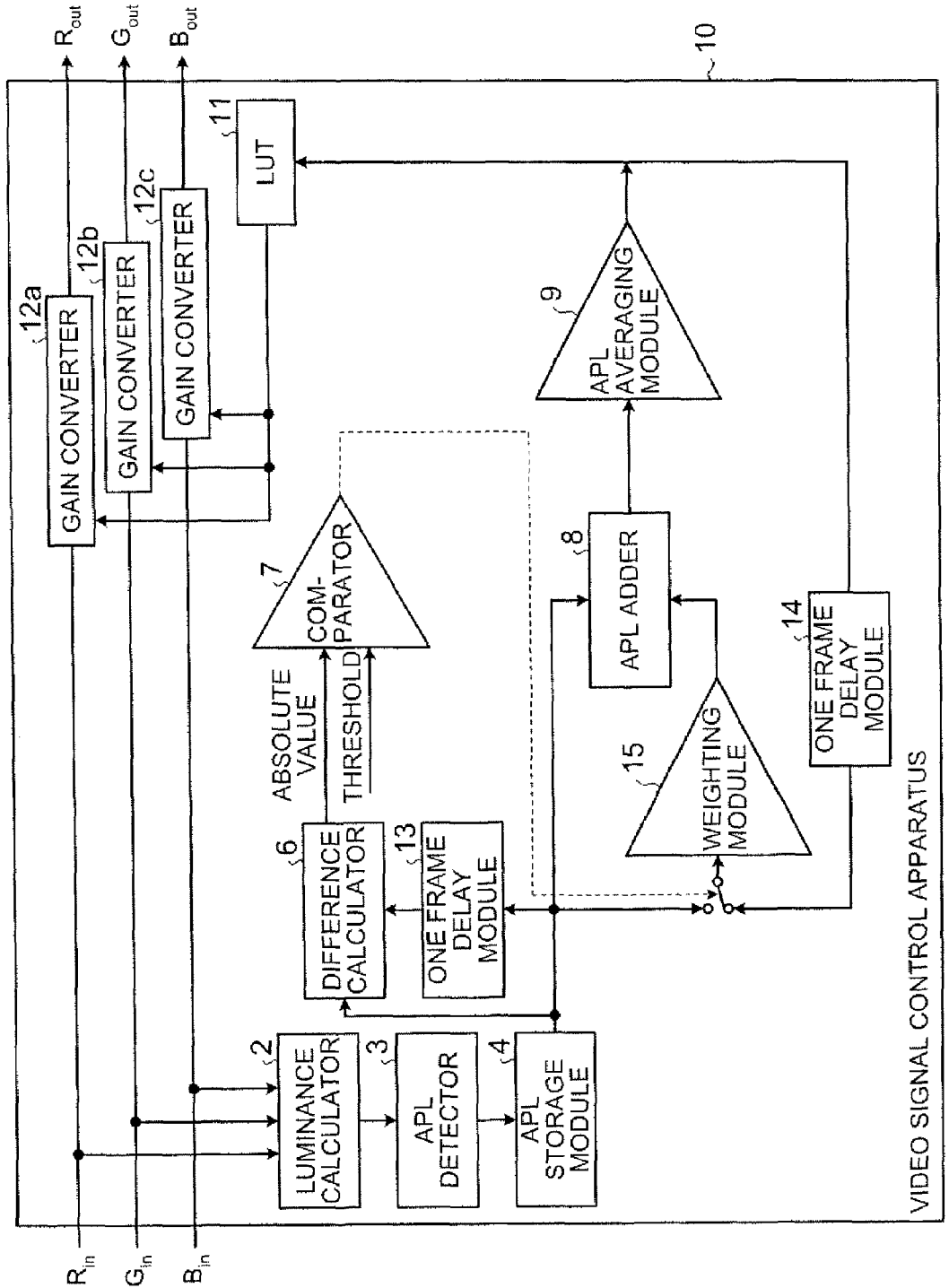
FIG. 3 is an exemplary circuit diagram of a video signal control apparatus according to a second embodiment of the invention.

FIG. 3 is a circuit diagram of a video signal control apparatus 10 according to a second embodiment of the invention. As illustrated in FIG. 3, the video signal control apparatus 10 is of basically similar in configuration to the video signal control apparatus 1 except for the absence of the APL memories $5_0, 5_{-1}, \ldots, 5_{-N+1}$, and that it further comprises one frame delay modules 13 and 14, and a weighting module 15. While the video signal control apparatus 1 uses a finite impulse response (FIR) filter, the video signal control apparatus 10 uses an infinite impulse response (IIR) filter. A detailed description will hereinafter be given of the one frame delay modules 13 and 14, and the weighting module 15.

The one frame delay module 13 delays the APL of the current frame output from the APL storage module 4 by one frame, and outputs it to the difference calculator 6. The difference calculator 6 calculates the absolute value of the difference between the APL of the current frame output from the APL storage module 4 and the APL of a frame prior by one frame to the current frame output from the one frame delay module 13.

The one frame delay module 14 delays the average of APLs output from the APL averaging module 9 by one frame, and outputs it to the weighting module 15. When the comparator 7 determines that the absolute value of the difference obtained by the difference calculator 6 is equal to or below a predetermined threshold (i.e., in such a case as that only part of the screen moves or changes), the weighting module 15 multiplies the APL output from the one frame delay module 14 by (N−1), and output the resultant APL to the APL adder 8. The APL adder 8 adds the APL multiplied by (N−1) output from the weighting module 15 to the APL of the current frame output from the APL storage module 4. The APL averaging module 9 divides the sum of the APLs obtained by the APL adder 8 by N to obtain the average of the APLs.

On the other hand, when the comparator 7 determines that the absolute value of the difference obtained by the difference calculator 6 exceeds the predetermined threshold (i.e., in such a case as that the entire screen changes) the weighting module 15 multiplies the APL of the current frame output from the APL storage module 4 by (N−1), and output the resultant APL to the APL adder 8. The APL adder 8 adds the APL multiplied by (N−1) output from the weighting module 15 to the APL of the current frame output from the APL storage module 4. The APL averaging module 9 divides the sum of the APLs obtained by the APL adder 8 by N to obtain the average of the APLs. That is, in this case, the average of the APLs obtained by the APL averaging module 9 represents the APL of the current frame.

In the video signal control apparatus 10 configured as above, as in the video signal control apparatus 1, when the change is small from the APL of a frame prior by one frame to the current frame to that of the current frame, and the absolute value of the difference between the APLs is equal to or below the threshold (i.e., in such a case as that only part of the screen moves or changes), the gain is set based on the average of the APLs of current and previous frames to control the display luminance of the current frame. On the other hand, when there is a substantial change from the APL of a frame prior by one frame to the current frame to that of the current frame, and the absolute value of the difference between the APLs exceeds the threshold (i.e., in such a case as that the entire screen changes), the gain is set based on the APL of the current frame to control the display luminance of the current frame.

As described above, according to the second embodiment, as in the first embodiment, when the APL change is small, the display luminance of the current frame is controlled based on the average of the APLs of current and previous frames. This suppresses the effect on the display luminance of the entire screen when only part of the screen moves, for example, when only the foreground moves without change in the background. Thus, video can be stabilized. When the APL change is large, the display luminance of the current frame is controlled based on the APL of the current frame. This ensures response to a change in the display luminance when, for example, the entire screen changes as in a scene change. Thus, the video signal control apparatus 10 can also achieve a balance between stability and response in the control of the display luminance.

In the above embodiments, in the interests of achieving simple implementation, the absolute value of the difference between the APL of a frame prior by one frame to the current frame and that of the current frame is calculated as the amount of APL change. When the absolute value is equal to or below a predetermined threshold, the display luminance of the current frame is controlled based on the average of the APLs of current and previous frames. Howeverr the amount of APL change may be calculated in different ways. For example, as the amount of APL change may be calculated the absolute value of the difference between the APL of a frame prior by a plurality of frames to the current frame and that of the current frame, or the absolute value of the difference between the APL obtained from a combination of the APLs of previous frames and that of the current frame. Alternatively, instead of simply averaging the APLs of current and previous frames, other operations can be performed as long as stabilization can be achieved.

The video signal control apparatus 1 and the video signal control apparatus 10 may each be provided with a display panel that displays video with controlled display luminance. Described below is the video signal control apparatus 1 (10) provided with such a display panel.

Figure 4:
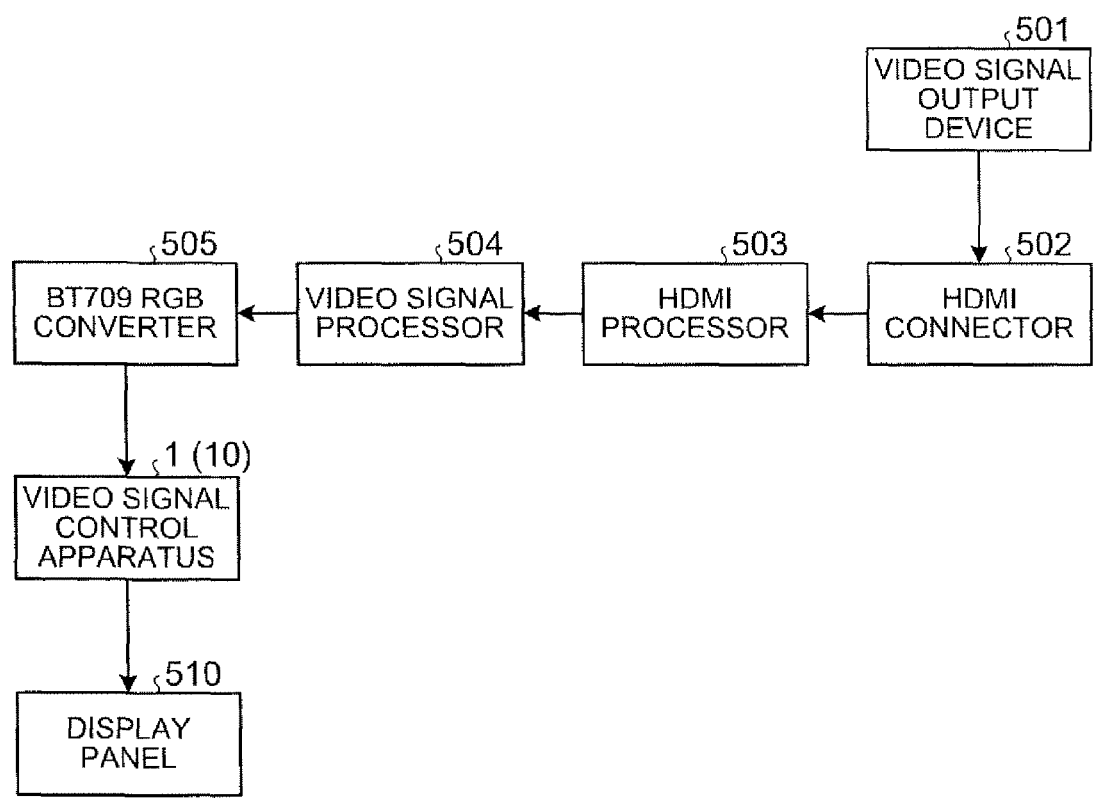
FIG. 4 is an exemplary diagram of the video signal control apparatus provided with a display panel in the embodiment.

FIG. 4 is a diagram of the video signal control apparatus 1 (10) provided with a display panel. As illustrated in FIG. 4, the video signal control apparatus 1 (10) is provided with an HDMI connector 502, an HDMI processor 503, a video signal processor 504, a BT709 RGB converter 505, and a display panel 510. Although not shown in FIG. 4, there is further provided a mechanism for receiving television broadcasting and displaying the video.

The HDMI connector 502 receives through an HDMI cable from a video signal output device 501, such as a video camera or a DVD recorder, a video signal (an HDMI signal) generated according to the xvYCC standard and compatible with the HUDM standard. The HDMI connector 502 then outputs the HDMI signal to the HDMI processor 503.

The HDMI processor 503 supports the HDMI 1.3 standard. The HDMI processor 503 separates an information packet from the HDMI signal, separates an HDMI-audio signal therefrom and reproduces it, and separates an HDMI-video signal therefrom. The HDMI-video signal represents YCbCr video signals (Y: luminance signal, CbCr: color difference signals) according to ITU-R BT.709 or ITU-R BT.601. The HDMI processor 503 outputs the HDMI-video signal to the video signal processor 504.

The video signal processor 504 performs scaling on the HDMI-video signal to convert it into a format in the size of the display panel 510. Besides, if the HDMI-video signal is an interlaced signal, the video signal processor 504 deinterlaces the interlaced signal. The scaling is performed to display HDMI-video signals, which vary in size format or the like, on the display panel 510. The video signal processor 504 outputs the YCbCr video signal.

The BT709 RGB converter 505 converts the YCbCr video signal into RGB signals of primary colors defined by ITU-R BT.709. The video signal control apparatus 1 (10) controls the display luminance of the RGB signals in the manner described above. Thus, the display panel 510 displays the video with controlled display luminance.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video signal control apparatus comprising:
an average luminance detector configured to detect average picture level (APL) of a video signal with respect to each frame; and
a display luminance controller configured to
control display luminance of a first frame by setting a gain responsive to an APL of the first frame but not responsive to an APL of a second frame prior to the first frame when an APL change between the first frame and the second frame exceeds a predetermined threshold, and
control the display luminance of the first frame by setting the gain responsive to an average APL of the first frame and the second frame when the APL change between the first frame and the second frame is equal to or below the predetermined threshold.

2. The video signal control apparatus of claim 1, wherein the display luminance controller is configured to calculate, as the APL change, a difference between the APL of the first frame and the APL of the second frame.

3. The video signal control apparatus of claim 1, further comprising a display device configured to display video with the display luminance controlled by the display luminance controller.

4. A video signal control method comprising:
detecting average picture level (APL) of a video signal with respect to each frame;
controlling display luminance of a first frame by setting a gain responsive to an APL of the first frame but not responsive to an APL of a second frame prior to the first frame when an APL change between the first frame and the second frame exceeds a predetermined threshold; and
controlling the display luminance of the first frame by setting the gain responsive to an average APL of the first frame and the second frame when the APL change between the first frame and the second frame is equal to or below the predetermined threshold.

* * * * *